(12) United States Patent
Luo et al.

(10) Patent No.: US 11,916,449 B2
(45) Date of Patent: Feb. 27, 2024

(54) FIXING DEVICE FOR ELECTRIC MOTOR

(71) Applicant: Xinjiang Goldwind Science & Technology Co., Ltd., Urumqi (CN)

(72) Inventors: Jiuyang Luo, Beijing (CN); Nan Hou, Beijing (CN)

(73) Assignee: XINJIANG GOLDWIND SCIENCE & TECHNOLOGY CO., LTD., Urumqi (CN)

(*) Notice: Subject to any disclaimer, the term of this patent is extended or adjusted under 35 U.S.C. 154(b) by 0 days.

(21) Appl. No.: 17/757,854

(22) PCT Filed: Aug. 25, 2020

(86) PCT No.: PCT/CN2020/111113
§ 371 (c)(1),
(2) Date: Jun. 22, 2022

(87) PCT Pub. No.: WO2021/128900
PCT Pub. Date: Jul. 1, 2021

(65) Prior Publication Data
US 2023/0034019 A1    Feb. 2, 2023

(30) Foreign Application Priority Data

Dec. 23, 2019    (CN) .......................... 201911338705.3

(51) Int. Cl.
*H01F 7/06* (2006.01)
*H02K 15/16* (2006.01)
(Continued)

(52) U.S. Cl.
CPC ............. *H02K 15/16* (2013.01); *F03D 13/10* (2016.05); *H02K 15/0006* (2013.01)

(58) Field of Classification Search
CPC .... H02K 15/0006; H02K 15/02; H02K 15/16; F03D 13/10; Y02E 10/72
See application file for complete search history.

(56) References Cited

U.S. PATENT DOCUMENTS

| | | | |
|---|---|---|---|
| 6,745,616 B1 * | 6/2004 | Katayama | G01B 5/0004 73/104 |
| 2008/0292467 A1 | 11/2008 | Borgen | |

(Continued)

FOREIGN PATENT DOCUMENTS

| | | |
|---|---|---|
| CN | 101048926 A | 10/2007 |
| CN | 101320931 A | 12/2008 |

(Continued)

OTHER PUBLICATIONS

International Search Report in corresponding PCT Application No. PCT/CN2020/111113, dated Oct. 29, 2020 (12 pages).

(Continued)

*Primary Examiner* — Paul D Kim
(74) *Attorney, Agent, or Firm* — Bayes PLLC (57) ABSTRACT

An assembly method and a fixing device for an electric motor are provided. The assembly method includes: carrying out preparation, wherein a stator of the electric motor is segmented, in the circumferential direction, into at least two stator segments, and a rotor of the electric motor is segmented, in the circumferential direction, into at least two rotor segments; carrying out pre-assembly, wherein the stator segments and the rotor segments are coaxially fixed to fixing devices to form segment modules, and predetermined gaps are maintained radially between the stator segments and the rotor segments; carrying out adjustment, wherein at least two fixing devices are moved and adjusted such that the stator segment and the rotor segment of the adjacent segment modules are mutually attached and aligned with each other along segmental end faces in the circumferential direction; carrying out assembly; and carrying out dismounting, and dismounting the fixing devices.

20 Claims, 4 Drawing Sheets

(51) Int. Cl.
*F03D 13/10* (2016.01)
*H02K 15/00* (2006.01)

(56) References Cited

U.S. PATENT DOCUMENTS

| | | | |
|---|---|---|---|
| 2012/0032546 A1 | 2/2012 | Numajiri | |
| 2012/0073118 A1 | 3/2012 | Bywaters et al. | |
| 2012/0181792 A1* | 7/2012 | Pettersen | F03D 80/00 290/55 |
| 2012/0261920 A1* | 10/2012 | Aso | H02K 7/14 310/90 |
| 2014/0028138 A1* | 1/2014 | Feher | F03D 1/00 310/156.08 |
| 2017/0204837 A1* | 7/2017 | Hartmann | F03D 9/25 |

FOREIGN PATENT DOCUMENTS

| | | | |
|---|---|---|---|
| CN | 102237727 | A | 11/2011 |
| CN | 102474166 | A | 5/2012 |
| CN | 102716780 | A | 10/2012 |
| CN | 103547794 | A | 1/2014 |
| CN | 103633751 | A | 3/2014 |
| CN | 109625558 | A | 4/2019 |
| EP | 2508749 | A1 | 10/2012 |
| EP | 2555382 | A1 | 2/2013 |
| EP | 2590301 | A1 | 5/2013 |
| IN | 103051118 | A | 4/2013 |
| JP | 2014045573 | A | 3/2014 |
| WO | 2015024590 | A1 | 2/2015 |

OTHER PUBLICATIONS

Office Action in corresponding Chinese Application No. 201911338705.3, dated Mar. 25, 2022 (19 pages).
Indian Office Action in related Indian Application No. 202217036575 dated Nov. 17, 2022 (5 pages).
Notice of Registration in related Chinese Application No. 201911338705.3 dated Nov. 30, 2022 (8 pages).
Australian Office Action in related Australian Application No. 2020414806 dated Feb. 28, 2023 (4 pages).
Extended European Search Report in related European Application No. 20908436.7 dated Dec. 20, 2023 (10 pages).

* cited by examiner

Fig. 3 a preparatory step, wherein a stator of the electric machine is segmenting into at least two stator segments in a circumferential direction, and a rotor of the electric machine is segmenting into at least two rotor segments in the circumferential direction ⟶ S1 a pre-assembly step, wherein the stator segments and the rotor segments are fixed coaxially on a fixing device to form a segment module, and a predetermined gap in a radial direction between the stator segments and the rotor segments is maintained ⟶ S2 an adjusting step, wherein at least two fixing devices are moved and adjusted, so that segmental end faces of the stator segments and the rotor segments of adjacent segment modules along the circumferential direction are respectively attached to and aligned with each other ⟶ S3 an assembly step, wherein at least two segment modules are assembled into a complete stator and a rotor in the circumferential direction, and then a main shaft, the stator and the rotor are assembled coaxially into an integral ⟶ S4 a disassembly step, wherein the fixing devices are disassembled ⟶ S5

FIXING DEVICE FOR ELECTRIC MOTOR

CROSS-REFERENCE TO RELATED APPLICATIONS

The present application is a national stage of International Application No. PCT/CN2020/111113, filed on Aug. 25, 2020, which claims priority to the Chinese Patent Application No. 201911338705.3, filed on Dec. 23, 2019. The entire contents of each of the above-identified applications are expressly incorporated herein by reference.

TECHNICAL FIELD

The present disclosure relates to the technical field of an electric machine, and in particular, to an assembly method and a fixing device for an electric machine.

BACKGROUND

As a single power of a wind turbine becomes larger and larger, an outer diameter of an electric machine becomes larger and larger. If the outer diameter of the electric machine is larger than 4.5 m, there is a risk of exceeding a road transportation limit, and transportation cost will increase sharply, limiting development of an electric machine with a large diameter.

Currently, an effective solution is usually to transport a stator and rotor of an electric machine with a large diameter into segments. After segmenting, there is a large magnetic attraction force at a predetermined air gap in a radial direction between stator segments and rotor segments, which increases a transportation difficulty and complexity of an assembly process.

SUMMARY

Embodiments of the present disclosure provide an assembly method and a fixing device for an electric machine, in particular to an electric machine with a large diameter. The assembly method can quickly and easily complete the assembly of the electric machine.

In an aspect, an embodiment of the present disclosure provides an assembly method for an electric machine, comprising a preparatory step, wherein a stator of the electric machine is segmenting into at least two stator segments in a circumferential direction, and a rotor of the electric machine is segmenting into at least two rotor segments in the circumferential direction; a pre-assembly step, wherein one of the stator segments and one of the rotor segments are fixed coaxially on a fixing device to form a segment module, and a predetermined gap in a radial direction between the stator segments and the rotor segments is maintained; an adjustment step, wherein at least two fixing devices are moved and adjusted, so that segmental end faces of the stator segments and the rotor segments of adjacent segment modules along the circumferential direction are respectively attached to and aligned with each other; an assembly step, wherein at least two segment modules are assembled into a complete stator and a rotor in the circumferential direction, and then a main shaft, the stator and the rotor are assembled coaxially into an integral; a disassembly step, wherein the fixing devices are disassembled.

In another aspect, an embodiment of the present disclosure provides a fixing device for assisting in assembling, disassembling and transporting an electric machine, wherein a stator of the electric machine comprises at least two stator segments arranged in segments in a circumferential direction, a rotor comprises at least two rotor segments arranged in segments in the circumferential direction, and the fixing device comprises: a base for supporting the stator segments and the rotor segments; a first fixture, arranged on the base and in an arc structure, and used for fixing the stator segments; a plurality of second fixtures, arranged on the base and distributed at intervals in an outer circumference side or an inner circumference side of the first fixture, and used for fixing the rotor segments; wherein the first fixture and the second fixtures respectively fix the stator segments and the rotor segments, so that a predetermined gap is always maintained between the stator segments and the rotor segments.

In the assembly method and the fixing device for an electric machine provided by embodiments of the present disclosure, at least two stator segments and at least two rotor segments of the electric machine that are segmented in the circumferential direction are assembled into a complete stator and rotor respectively in the circumferential direction via the fixing device, so that the assembly of the electric machine can be completed quickly and easily, the transportation difficulty, as well as the quality risk of reassembly, of the electric machine is reduced.

BRIEF DESCRIPTION OF DRAWINGS

The present disclosure can be better understood from the following description of specific embodiments of the present disclosure in conjunction with accompanying drawings, wherein other features, objects and advantages of the present disclosure can be better understood by reading the following detailed description of non-limiting embodiments with reference to the accompanying drawings. It will become apparent that the same or similar reference signs refer to the same or similar features.

DESCRIPTION OF REFERENCE SIGNS

1—stator; 10—stator segment; 11—stator support; 12—core winding; 13—stator flange; 2—rotor; 20—rotor segment; 21—rotor support; 22—magnet pole module; 23—rotor flange; 3—main shaft; 31—fixed shaft; 32—rotating shaft; 33—bearing; M—segment module;

4—fixing device; 40—base; 401—positioning surface; 41—first fixture; 42—second fixture; 5—leveling device; 6—sliding mechanism; 61—support frame; 610—groove; 620—ball; 62—guide rail; 7—driving device; 81—aligning shaft; 82—aligning hole.

DETAILED DESCRIPTION

Features and exemplary embodiments of various aspects of the present disclosure are described in detail below. Numerous specific details are disclosed in the following detailed description to provide a thorough understanding of the present disclosure. However, it will be apparent to those skilled in the art that the present disclosure may be practiced without some of these specific details. The following description of embodiments is merely to provide a better understanding of the present disclosure by illustrating examples of the present disclosure. The present disclosure is in no way limited to any specific configurations and algorithms set forth below, but covers any modifications, substitutions and improvements of elements, components, and algorithms without departing from the spirit of the present disclosure. In the drawings and the following description, well-known structures and techniques have not been shown in order to avoid unnecessarily obscuring the present application.

To better understand the present disclosure, an assembly method and a fixing device for an electric machine provided by embodiments of the present disclosure will be described in detail below with reference to FIGS. 1 to 6. In the present disclosure, the electric machine is exemplarily in a structure of an outer rotor and an inner stator. It can be understood that the method and the fixing device of the present disclosure are not limited to the above-mentioned electric machine, but also applicable to the structure of an outer stator and an inner rotor. In addition, in the present application, "a radial direction" is defined as a diametrical direction of the electric machine, "an axial direction" is defined as an axial direction of the electric machine, and "a circumferential direction" is defined as a circumferential direction of the electric machine.

Figure 1:
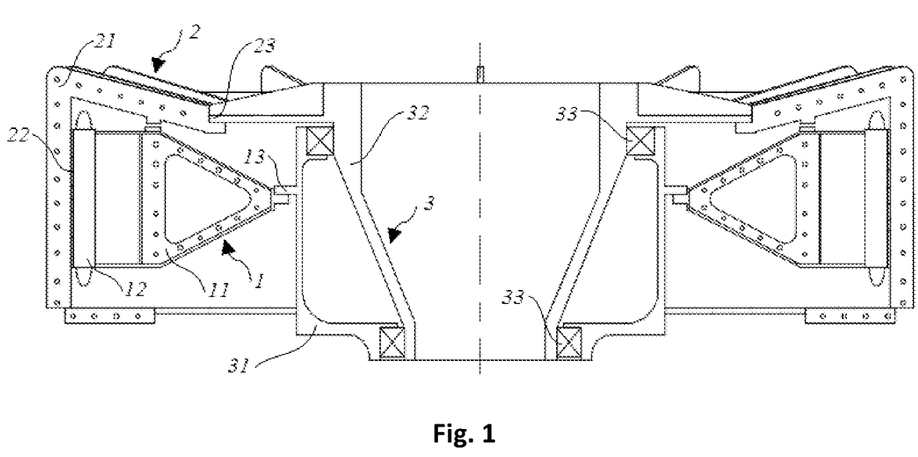
FIG. 1 is a schematic structural diagram of an electric machine provided by an embodiment of the present disclosure.

Referring to FIG. 1, an embodiment of the present disclosure provides an electric machine including a rotor 2, a stator 1, and a main shaft 3 generally radially from outside to inside. The main shaft 3 includes a fixed shaft 31, a rotating shaft 32, and a bearing 33 disposed between the fixed shaft 31 and the rotating shaft 32 coaxially arranged. The stator 1 is connected to the fixed shaft 31 via a stator flange 13, and the rotor 2 is connected to the rotating shaft 32 via a rotor flange 23.

For an electric machine with a large diameter, segmenting the electric machine evenly or unevenly in a circumferential direction can break through limitations of transportation restrictions on a diameter of the electric machine, which is an innovative way to achieve an electric machine with a large diameter or extra-large diameter. But for a megawatt-class electric machine, especially those used in wind turbines, a magnetic attraction between the stator 1 and the rotor 2 can reach several tons. How to maintain an original performance of the electric machine after segmenting and how to minimize deformation during transportation is a new challenge for assembly and transportation of the segmented electric machine.

To solve the above technical problem, the present disclosure proposes a solution. Specifically, the stator 1 of the electric machine is segmented into at least two stator segments 10 along the circumferential direction, and the rotor 2 is segmented into at least two rotor segments 20 along the circumferential direction. The number of specific segments can be the same or different. However, to optimize and simplify the assembly procedure, the stator 1 and the rotor 2 are respectively segmented into the same number of stator segments 10 and rotor segments 20. The stator segments 10 and the rotor segments 20 are coaxially arranged, and when the segmenting numbers are the same, a segment module M including one stator segment 10 and one rotor segment 20 is formed in a one-to-one correspondence. When the segmenting numbers are different, one stator segment 10 and several rotor segments 20 can form one segment module M, several stator segments 10 and one rotor segment 20 can form one segment module M, of course, a number of stator segments 10 and a different number of rotor segments 20 form a segment module M. In this case, a central angle of the stator and a central angle of the rotor in one segment module M are the same. In the process of transportation and assembly of the segment module M, it is necessary to ensure that a predetermined distance in the radial direction between each stator segment 10 and each rotor segment 20 is always maintained, such as a designed air gap distance. So it is necessary to customize a firm fixing device and assembly/disassembly tooling, and after repeated research and simulation calculations, the predetermined air gap needs to be ensured to remain unchanged from many aspects.

Figure 2:
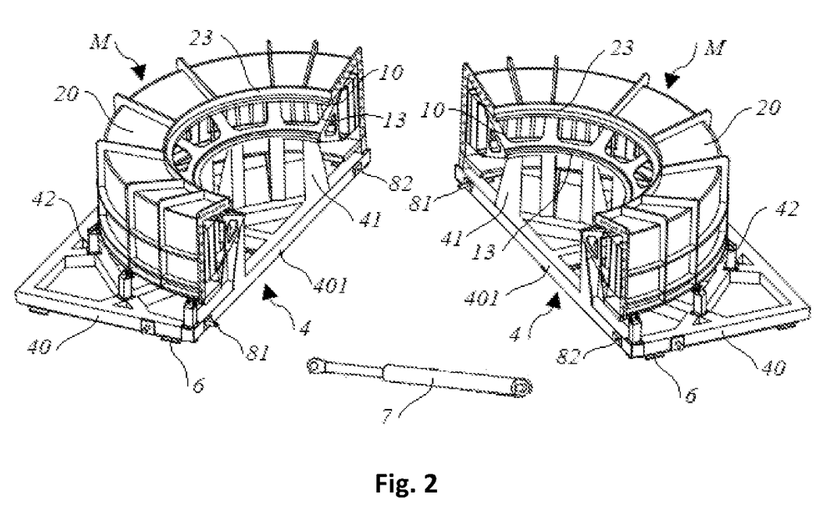
FIG. 2 is a schematic diagram of a usage scenario of a fixing device provided by an embodiment of the present disclosure.

Referring to FIG. 2, taking the stator 1 and the rotor 2 segmented into two segments in the circumferential direction as an example, an embodiment of the present disclosure provides a fixing device 4 for assisting in assembling, disassembling, and transporting the electric machine. The fixing device 4 includes a base 40, a first fixture 41 and a second fixture 42.

To adapt to a semicircular shape of the segment module M including one stator segment 10 and one rotor segment 20, the base 40 has a rectangular frame structure as a whole for supporting the stator segment 10 and the rotor segment 20. The base 40 is mainly used to carry the weight of the stator segment 10 and the rotor segment 20, and needs to have sufficient bearing capacity. The base 40 can be provided as a steel structure in the form of a frame, which is the lightest in weight while satisfying the structural strength and rigidity.

The first fixture 41 is arranged on the base 40, in an arc-shaped structure to adapt to the arc-shaped shape of the stator flange, and a long column of the first fixture 41 is fixed to the stator flange, that is, used for fixing to the stator segment 10. Specifically, the long column of the first fixture 41 is used to be fixed to the segmented stator flange 13. To prevent the stator segment 10 from being affected by a magnetic attraction, the long column is set in a wedge shape with a narrow upper part and a wide lower part, so as to stably and fixedly support the stator segment 10 on the base 40. The stator flange 13 is provided with a plurality of positioning holes in the circumferential direction. When a complete electric machine is assembled, these positioning holes are connected with the fixed shaft 31 via fasteners. In order to facilitate the fixing of the stator segment 10 to the first fixture 41 and the subsequent connection of the stator segment 10 to the fixing shaft 31, a part of the positioning holes can be selected from the plurality of positioning holes of the stator flange 13 to be fixedly connected to the long column of the first fixture 41, to avoid deformation of the stator flange of the stator segment 10 due to excessive fixed strain. When the complete stator 1 is connected to the fixed shaft 31 later, firstly the remaining positioning holes are connected to the fixed shaft 31, and then fasteners of the positioning holes connected to the first fixture 41 take out, and the stator is connected to the fixed shaft 31 via the fasteners.

The second fixture 42 is also disposed on the base 40. The second fixture 42 includes a plurality of short columns distributed at intervals in the outer circumferential side or inner circumferential side of the first fixture 41 for fixing the rotor segment 20. The first fixture 41 and the second fixture 42 respectively fix the stator segment 10 and the rotor segment 20, so that a preset distance is always maintained between the stator segment 10 and the rotor segment 20.

In some embodiments, the number of the second fixtures 42 is greater than the number of the first fixture 41. The second fixtures 42 can move relative to the first fixture 41 in the radial direction of the electric machine to adapt for different preset distances between the stator 1 and the rotor 2.

When the electric machine is in the structure of the inner stator and the outer rotor, the plurality of second fixtures 42 are distributed at intervals along the outer circumferential side of the first fixture 41. When the electric machine is in the structure of the inner rotor and the outer stator, the plurality of second fixtures 42 are distributed at intervals along the inner circumferential side of the first fixture 41.

Taking the electric machine in the structure of the inner stator and the outer rotor as an example, a plurality of second fixtures 42 in the form of short columns are used to fix the outer circumferential edge of the segmented rotor segment 20. Since the rotor in the form of the outer rotor is in the structure of "a thin shell", short columns with close spacing can be arranged in the circumferential direction to fix the rotor segment 20. That is, the number of short columns is greater than the number of long columns. In some embodiments, the radial position of the second fixtures 42 relative to the first fixture 41 is adjustable, so as to facilitate the installation of the rotor segment 20 and to adapt for different predetermined air gaps between the stator and rotor. For example, the base 40 is provided with an oblong hole, and the second fixtures 42 is pre-connected to the base 40 by a bolt passing through the oblong hole. The oblong hole can adjust the position of the second fixtures 42 relative to the first fixture 41. After the rotor segment 20 is installed, the distance between the first fixture 41 and the second fixtures 42 is adjusted to keep the preset distance therebetween. And then the bolt is fastened to the base 40 to ensure that a predetermined air gap in the radial direction is always maintained between the stator segment 10 and the rotor segment 20 of the segment module M, to meet the use requirements of the electric machine with a large diameter.

As shown in FIG. 2, the electric machine with a large diameter is segmented into two segment modules M, each fixing device 4 supports one segment module M. The two segment modules M can be assembled into a complete stator 1 and rotor 2 by a movement and adjustment of the two fixing devices 4. Of course, the two assembled fixing devices 4 can also be disassembled, and the segment modules M together with the fixing device 4 can be transported and performed other operations.

In the fixing device 4 provided in the embodiment of the present disclosure, the stator segment 10 of the electric machine with a large diameter is fixed by a first fixture 41, and the rotor segment 20 is fixed by a plurality of second fixtures 42. During the transportation and assembly process of the electric machine with a large diameter, the preset distance is always maintained between the first fixture 41 and the second fixtures 42, which is beneficial for the electric machine having subjected a test and verification, and the change of the air gap during transportation can be avoided. The stable air gap value maintained during the transportation process can ensure the performance of the electric machine without re-testing and re-verification after reassembly, which can improve the assembly quality of the electric machine with a large diameter, reduce the transportation difficulty of the electric machine with a large diameter and the quality risk of reassembly.

The specific structure of the fixing device 4 provided in the embodiment of the present disclosure will be described in further detail below with reference to the accompanying drawings. In addition, for the convenience of description, the embodiment of the present disclosure takes the electric machine in the structure of an inner stator and an outer rotor structure as an example for description.

Figure 3:
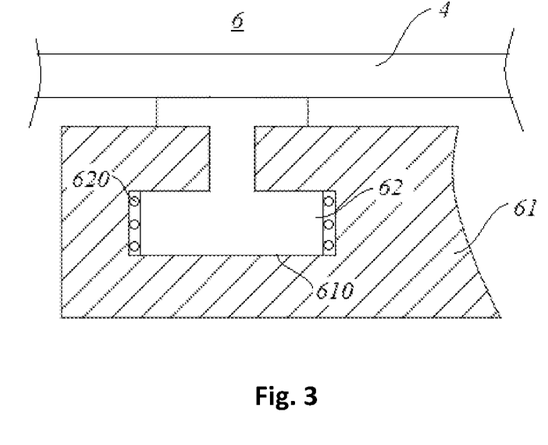
FIG. 3 is a structural schematic diagram of a sliding mechanism of the fixing device shown in FIG. 2.

Please refer to FIG. 2 and FIG. 3 together. To facilitate the movement and adjustment of the fixing device 4, the fixing device 4 further includes a sliding mechanism 6 enables the adjacent fixing devices 4 to be driven by the driving device 7 to approach or move away along a preset path.

The fixing device 4 also includes a sliding mechanism 6 disposed under the base 40. The sliding mechanism 6 includes a support frame 61 with a groove 610 and a guide rail 62 movably connected with the groove 610. The groove 610 is arranged perpendicular to segmental end face of the stator segment 10 or the rotor segment 20 in the circumferential direction, and the base 40 is connected with the guide rail 62.

In some embodiments, the cross section of the guide rail 62 is set in an "I" shape, and the lower lateral side of the guide rail 62 is accommodated in the groove 610 and moves back and forth along the groove 610 of the support frame 61. The upper lateral side of the guide rail 62 is fixedly connected with the base 40, which increases the connection area between the guide rail 62 and the base 40, and can carry the weight of the base 40 and the segment module M. To improve the smoothness of the guide rail 62 moving back and forth along the groove 610, balls 620 are provided on both sides of the groove 610 and are coated with lubricating oil.

In addition, the groove 610 can be set perpendicular to the segmental end face of the stator segment 10 or the rotor segment 20 along the circumferential direction, or the extension direction of the groove 610 can be set to be the preset moving path direction when each fixing device 4 is assembled or disassembled. In this way, it can be ensured that each fixing device 4 drives the respective segment modules M to approach or move away from each other, so that all segment modules M can be assembled into a complete stator 1 and rotor 2, or a complete stator 1 and rotor 2 can be disassembled.

Further, the fixing device 4 also includes a driving device 7. One end of the driving device 7 is arranged on the base 40 of one fixing device 4, and the other end is arranged on the base 40 of another fixing device 4. The driving device 7 drives the two fixing devices 4 along the respective grooves 610 to move and approach.

The driving device 7 may be a hydraulic cylinder or an air cylinder. Since the bottom of the fixing device 4 is installed with the sliding mechanism 6, the driving device 7 drives the two adjacent fixing devices 4 via a telescopic motion to drive the respective segment modules M to move relative to each other and approach each other, so that end faces in the circumferential direction of the stator segments 10 of each of the segment modules M are spliced to each other by fasteners, and end faces of the rotor segments 20 of each of the segment modules M in the circumferential direction are spliced to each other by fasteners.

Further, the base 40 includes a positioning surface 401 located at the segmental end faces of the stator segment 10 or the rotor segment 20 of the base 40 and disposed parallel to the segmental end surface of the stator segment 10 or the rotor segment 20 in the circumferential direction. The positioning surface 401 is provided with an aligning device including an aligning shaft 81 and an aligning hole 82. The aligning shaft 81 of one fixing device 4 can be inserted into the aligning hole 82 of another fixing device 4 at a corresponding position, thereby allowing a position adjustment and positioning when the assembly is approached. The aligning device may also include several aligning shafts 81 or aligning holes 82 distributed at intervals along the length direction of the positioning surface 401 to perform real-time fine-tuning of the position of the fixing device 4 during assembly to meet the precise assembly requirements of the electric machine.

In some embodiments, the plane on which the positioning surface 401 is located does not exceed the segmental end surface of the stator segment 10 or the rotor segment 20 in the circumferential direction. That is, the positioning surface 401 is "indented" to the segmental end surfaces of the stator segment 10 and the rotor segment 20, so as to avoid the adjacent stator segments 10 or rotor segments 20 unable to be spliced together due to a too large gap when the segmental end faces are spliced together. In addition, the aligning shaft 81 of one fixing device 4 can be set to protrude from the segmental end faces of the stator segment 10 and the rotor segment 20, and can be inserted into the aligning hole 82 of the other fixing device 4, so as to ensure that the stator segments 10 and the rotor segments 20 of each of the segment modules M are aligned in the axial direction and the radial direction, respectively, and then spliced together to prevent misalignment.

Since a ground at an assembly site is inevitably uneven, in order to facilitate the precise splicing of respective segment modules M, the fixing device 4 further includes a leveling device 5 arranged under the base 40 and is used to adjust the various components of the fixing device 4 to be located on the same horizontal plane. By pre-arranging a plurality of leveling devices 5 on the assembled ground, placing the fixing devices 4 on the leveling devices 5, and adjusting the height of each fixing device 4, so that all the segment modules M are on the same horizontal plane, to facilitate the assembly of the segment modules M.

After all the segment modules M are spliced together by the fixing device 4, the main shaft 3 is connected with the stator 1 and the rotor 2, and the assembly of the electric machine can be completed. Then, the fasteners, such as bolts between the first fixture 41 and the stator flange 13, and the fasteners, such as the bolts between the second fixtures 42 and the rotor segment 20, are removed to separate the electric machine from the fixing device 4. When it is necessary to split the segmented electric machine, the electric machine is firstly fixed to the fixing device 4, the stator 1 and the rotor 2 are then fixed respectively, the main shaft 3 is taken out, and the driving device 7 is started, so that the two fixing devices 4 are separated. The respective fixing devices 4 carries the segment module M of the electric machine segments to be transported and perform other operations.

Figure 4:
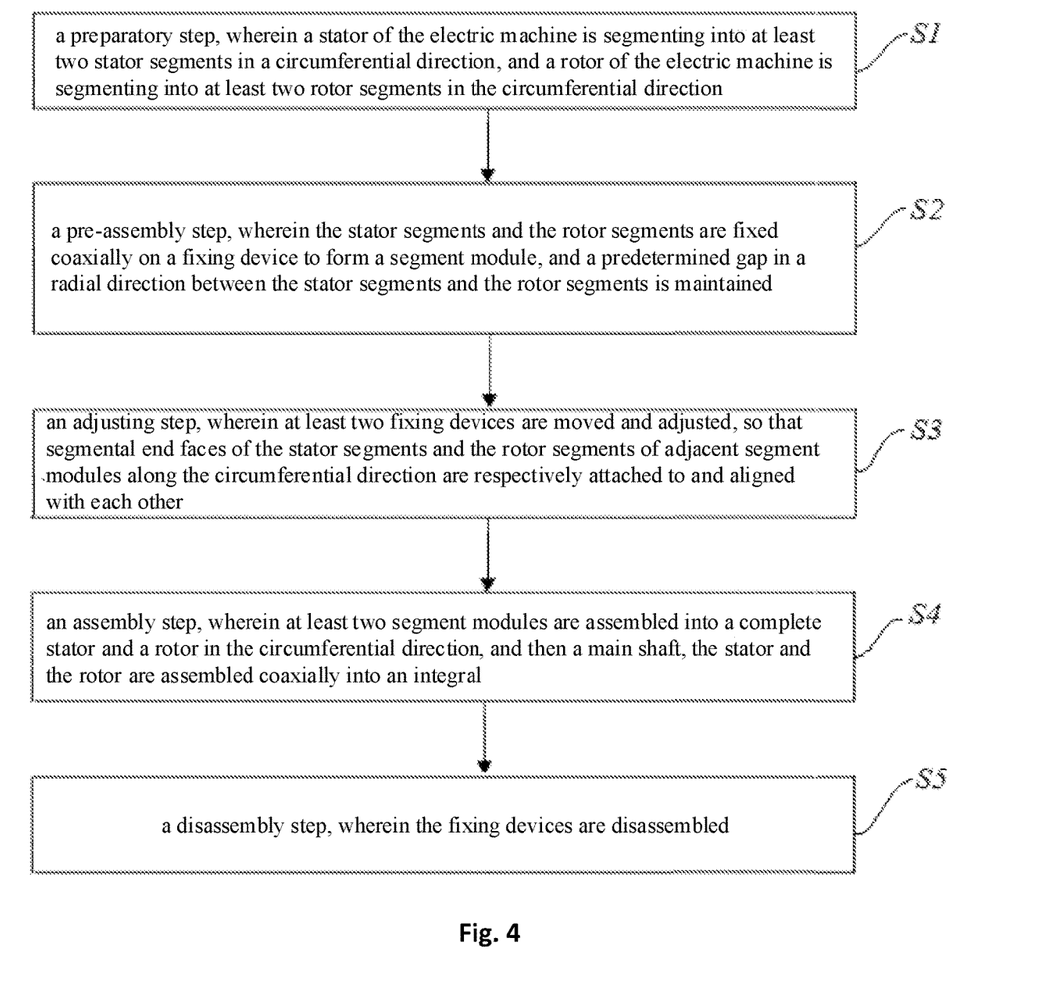
FIG. 4 is a flowchart of an assembly method for an electric machine provided by an embodiment of the present disclosure.

Referring to FIG. 4, an embodiment of the present disclosure also provides an assembly method for an electric machine. Meanwhile, the disassembly process before the transport of the segmented electric machine is basically the opposite of the assembly method, and the assembly method is used as an example to illustrate. The assembly method for the electric machine includes:

a preparatory step S1: wherein the stator 1 of the electric machine is segmented into at least two stator segments 10 in the circumferential direction, and the rotor 2 of the electric machine is segmented into at least two rotor segments 20 in the circumferential direction;

a pre-assembly step S2: wherein the stator segments 10 and the rotor segments 20 are coaxially fixed on the fixing device 4 to form the segment module M, and a predetermined gap is maintained in the radial direction between the stator segment 10 and the rotor segment 20;

an adjustment step S3: wherein at least two fixing devices 4 are moved and adjusted, so that the segmental end faces of the stator segment 10 and the rotor segment 20 of the adjacent segment modules M in the circumferential direction are respectively attached to and aligned with each other;

an assembly step S4: wherein the at least two segment modules M are assembled in the circumferential direction into a complete stator 1 and rotor 2, and then the main shaft 3 is assembled coaxially with the stator 1 and the rotor 2 into an integral;

a disassembly step S5: wherein the fixing devices 4 are disassembled.

In the assembly method for an electric machine provided by the present disclosure, the at least two stator segments 10 and at least two rotor segments 20 that are segmented in the circumferential direction of the electric machine are assembled in the circumferential direction into a complete stator 1 and a rotor 2 through the fixing devices 4. The assembly of the electric machine can be completed quickly and easily, which reduces the transportation difficulty of the electric machine and the quality risk of assembly.

The specific steps of the assembly method for an electric machine of the present disclosure will be further described below with reference to the accompanying drawings.

Figure 5:
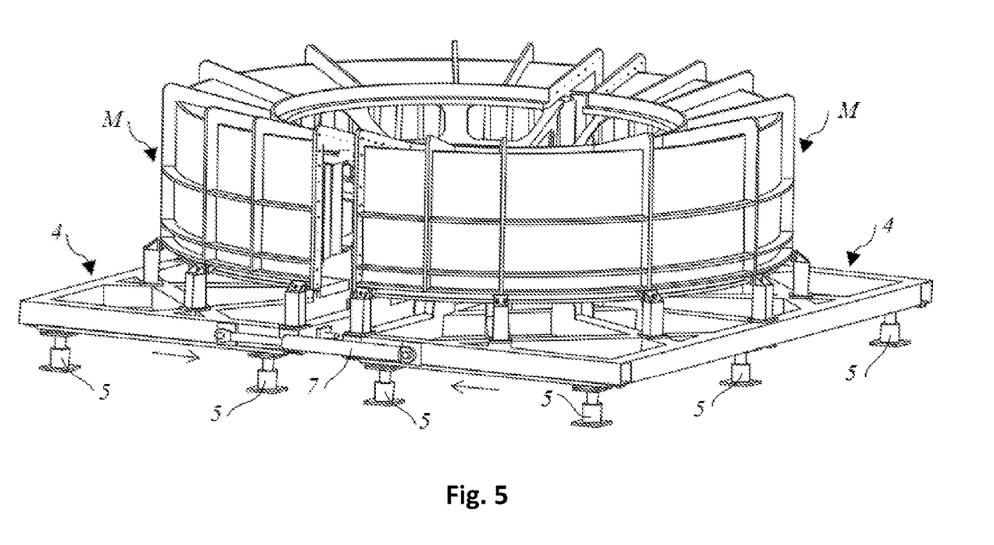
FIG. 5 is a schematic diagram of a scenario of an adjustment step in the assembly method for an electric machine shown in FIG. 4.
Figure 6:
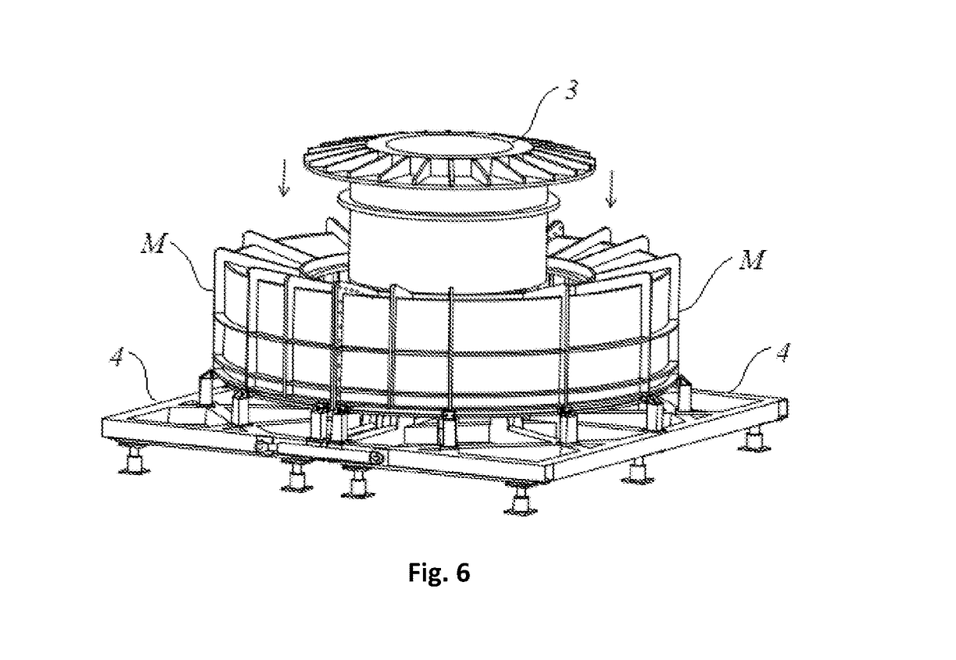
FIG. 6 is a schematic diagram of a scenario of an assembly step in the assembly method for an electric machine shown in FIG. 4.

Please refer to FIG. 5 and FIG. 6 together, the adjustment step S3 includes: adjusting the height of each fixing device 4 through the leveling device 5 disposed below the fixing device 4 so that at least two segment modules M are in the same horizontal plane.

Since the ground at the assembly site is inevitably uneven, in order to facilitate the precise splicing of each segment module M, a plurality of leveling devices 5 can be pre-installed on the ground at the assembly site, and then the fixing devices 4 are placed on the leveling device 5. The height of each fixing device 4 is adjusted so that the segment modules M are on the same horizontal plane, so as to facilitate the assembly of the segment modules M.

In some embodiments, the adjustment step S3 further includes:

step S31: wherein a sliding mechanism 6 is arranged between the fixing device 4 and the leveling device 5, a driving device 7 is also arranged between two adjacent fixing devices 4, and the two adjacent fixing devices are driven by the driving device 7 to move relative to each other under the action of the respective sliding mechanisms 6, so that the segmental end faces of the stator segments 10 and the rotor segments 20 of the adjacent segment modules M in the circumferential direction are respectively attached to each other.

As mentioned above, the sliding mechanism 6 includes the support frame 61 with the groove 610 and the guide rail 62 movably connected to the groove 610. The groove 610 can be perpendicular to the segmental end face of the stator segment 10 or the rotor segment 20 in the circumferential direction, it can also be arranged in any direction along the preset moving path of the fixing device 4. The base 40 is connected with the guide rail 62. The driving device 7 can drive the two adjacent fixing devices 4 to move along the respective groove 610 and approach each other.

In some embodiments, the adjustment step S3 further includes:

step S33: wherein the segment end faces of the stator segment 10 and the rotor segment 20 of the two adjacent segment modules M in the circumferential direction are aligned with each other through the aligning device provided on each fixing device 4.

As mentioned above, the base 40 includes the positioning surface 401 arranged parallel to the segmental end surface of the stator segment 10 or the rotor segment 20 in the circumferential direction. The aligning device includes the aligning shaft 81a protruding from the segmental end face of the stator segment 10 or the rotor segment 20 and the aligning hole 82 at the corresponding position. The aligning shaft 81 of one fixing device 4 is inserted into the aligning hole 82 of the other adjacent fixing device 4, which can ensure that the stator segments 10 and the rotor segments 20 of the modules M are aligned axially and radially, respectively, and then spliced together.

Further, the assembly step S4 includes:

step S41: wherein the stator segments 10 of the at least two segment modules M are assembled in the circumferential direction into a complete stator 1, and the rotor segments 20 are assemble in the circumferential direction into a complete rotor 2.

step S42: wherein the main shaft 3 is provided including the fixed shaft 31, the rotating shaft 32, and the bearing 33 disposed between the fixed shaft 31 and the rotating shaft 32 which are coaxially arranged.

step S43: wherein the rotor 2 is fixed to the rotating shaft 32 and the stator 1 is fixed to the fixed shaft 31.

The main shaft 3 can be hoisted to the top of the fixing device 4 through a hoisting tool, the stator 1 is connected to the fixed shaft 31 through the stator flange, and the rotor 2 is connected to the rotating shaft 32 through the rotor flange.

In addition, when the electric machine is a permanent magnet electric machine, the preparatory step S1 further includes:

step S11: wherein a rotor support 21 is segmented into at least two rotor support segments in the circumferential direction, and a plurality of magnetic pole modules 22 are installed on the rotor support segments to form the rotor segment 20.

Further, the preparatory step S2 also includes:

step S21: wherein the stator segment 10 of the segment module M is fixed to the first fixture 41 of the fixing device 4, the rotor support segment of the segment module M is fixed to the second fixtures 42, the first fixture 41 and the second fixtures 42 are coaxially disposed and spaced apart by a predetermined distance, so as to maintain the predetermined gap in the radial direction between the stator segment 10 and the magnetic pole module 22.

The above-mentioned method for assembling, disassembling and transporting the electric machine through the fixing device 4 provided by the present disclosure is to fix an end cover side of the electric machine on the fixing device 4 arranged basically horizontally. The air gap between the stator and the rotor of the electric machine is not affected by the weight of the stator and rotor itself, which is advantageous for maintaining a stable value of the air gap. Of course, the plane of the fixing device 4 can also extend in a substantially vertical direction, and the electric machine is fixed to the fixing device 4 in a working state, so that the assembled electric machine can be as close as possible to the working state and ensure the stability of the electric machine operation.

Those skilled in the art should understand that the above-mentioned embodiments are all illustrative and not restrictive. Different technical features appearing in different embodiments can be combined to achieve beneficial effects. Those skilled in the art should be able to understand and implement other variant embodiments of the disclosed embodiments on the basis of studying the drawings, the description and the claims. In the claims, the term "comprising" does not exclude other means or steps; an item is intended to include one/one kind or more/kinds of items when not modified by a quantifier, and may be used interchangeably with "one/one kind or more/kinds of items"; the terms "first", "second" are used to designate names and not to indicate any particular order. Any reference signs in the claims should not be construed as limiting the scope of protection. The functions of the multiple parts appearing in the claims can be realized by a single hardware or software module. The appearance of certain technical features in different dependent claims does not mean that these technical features cannot be combined to achieve beneficial effects.

The invention claimed is:

1. An assembly method for an electric machine of a wind turbine, comprising:
segmenting a stator of the electric machine into a plurality of stator segments in a circumferential direction, and segmenting a rotor of the electric machine into a plurality of rotor segments in the circumferential direction;
forming at least two segment modules by the plurality of stator segments and the plurality of rotor segments,
wherein each segment module comprises at least one stator segment and at least one rotor segment,
wherein the at least one stator segment and the at least one rotor segment of each segment module are fixed coaxially on a respective fixing device by fixing the at least one stator segment to one or more first fixtures of the respective fixing device and fixing the at least one rotor segment to one or more second fixtures of the respective fixing device to maintain a predetermined gap in a radial direction between the at least one stator segment and the at least one rotor segment,
wherein the respective fixing device comprises a base on which the one or more first fixtures and the one or more second fixtures are arranged, and
wherein the base comprises a positioning surface arranged parallel to a segmental end face of the at least one stator segment or the at least one rotor segment in the circumferential direction, the positioning surface is provided with an aligning device comprising an aligning shaft, and the aligning shaft of the respective fixing device is insertable into an aligning hole of an adjacent fixing device;
moving and adjusting respective fixing devices associated with the at least two segment modules, so that segmental end faces of stator segments and rotor segments of adjacent segment modules from the at least two segment modules in the circumferential direction are respectively attached to and aligned with each other;
assembling the at least two segment modules into the stator and the rotor in the circumferential direction, and then assembling a main shaft, the stator, and the rotor coaxially into an integral; and
dissembling the respective fixing devices associated with the at least two segment modules.

2. The assembly method according to claim 1, wherein adjusting the respective fixing devices associated with the at least two segment modules comprises adjusting a height of each of the respective fixing devices by a leveling device provided below the respective fixing devices, so that the at least two segment modules are on the same horizontal plane.

3. The assembly method according to claim 2, wherein adjusting the respective fixing devices associated with the at least two segment modules further comprises:
arranging a sliding mechanism between the respective fixing devices and the leveling device; and
arranging a respective driving device between each two adjacent fixing devices to drive the two adjacent fixing devices to move relative to each other under the action of the sliding mechanism, so that the segmental end faces of the stator segments and the rotor segments of the adjacent segment modules in the circumferential direction are respectively attached to each other.

4. The assembly method according to claim 3, wherein adjusting the respective fixing devices associated with the at least two segment modules further comprises aligning the segmental end faces of the stator segments and the rotor segments of the adjacent segment modules in the circumferential direction with the aligning device.

5. The assembly method according to claim 1, wherein assembling the at least two segment modules comprises:
assembling the plurality of stator segments of the at least two segment modules in the circumferential direction to form the stator, and assembling the plurality of rotor segments of the at least two segment modules in the circumferential direction to form the rotor;
providing the main shaft comprising a fixed shaft, a rotating shaft, and a bearing disposed between the fixed shaft and the rotating shaft, wherein the fixed shaft and the rotating shaft are coaxially arranged;
fixing the rotor to the rotating shaft, and fixing the stator to the fixed shaft.

6. The assembly method according to claim 1, wherein the electric machine is configured as a permanent magnet electric machine, and segmenting the rotor further comprises:
segmenting a rotor support into a plurality of rotor support segments in the circumferential direction, and installing a plurality of magnetic pole modules on the plurality of rotor support segments to form the plurality of rotor segments.

7. The assembly method according to claim 6, wherein segmenting the rotor further comprises:
fixing a respective rotor support segment of each segment module to the one or more second fixtures of the respective fixing device, wherein the one or more first fixtures and the one or more second fixtures of the respective fixing device are coaxially arranged and spaced apart by a predetermined distance, so that the predetermined gap is maintained in the radial direction between the at least one stator segment and a respective magnetic pole module of the at least one rotor segment.

8. A fixing device for assisting in assembling, disassembling and transporting an electric machine of a wind turbine, wherein a stator of the electric machine comprises a plurality of stator segments arranged in a circumferential direction, wherein a rotor of the electric machine comprises a plurality of rotor segments arranged in the circumferential direction, wherein at least two segment modules are formed by the plurality of stator segments and the plurality of rotor segments, wherein the fixing device is used to fix a segment module of the at least two segment modules with the segment module including at least one stator segment and at least one rotor segment, the fixing device comprising:
a base for supporting the at least one stator segment and the at least one rotor segment of the segment module;
one or more first fixtures, arranged on the base and in an arc structure, and used for fixing the at least one stator segment; and
one or more second fixtures, arranged on the base and distributed at intervals along an outer circumference side or an inner circumference side of the one or more first fixtures, and used for fixing the at least one rotor segment,
wherein the one or more first fixtures and the one or more second fixtures respectively fix the at least one stator segment and the at least one rotor segment to maintain a predetermined gap between the at least one stator segment and the at least one rotor segment, and
wherein the base comprises a positioning surface arranged parallel to a segmental end face of the at least one stator segment or the at least one rotor segment in the circumferential direction, the positioning surface is provided with an aligning device comprising an aligning shaft, and the aligning shaft of the fixing device is insertable into an aligning hole of an adjacent fixing device.

9. The fixing device according to claim 8, wherein a total number of the one or more second fixtures is greater than a total number of the one or more first fixtures.

10. The fixing device according to claim 8, wherein the one or more second fixtures are movable relative to the one or more first fixtures in a radial direction of the electric machine to adapt for different predetermined gaps between the stator and the rotor.

11. The fixing device according to claim 8, further comprising a sliding mechanism allowing the fixing device to approach or move away from the adjacent fixing device in a preset moving path under the driving of a driving device.

12. The fixing device according to claim 11, wherein the sliding mechanism is arranged under the base and comprises a support frame with a groove and a guide rail movably connected with the groove, the groove is arranged perpendicular to the segmental end face of the at least one stator segment or the at least one rotor segment in the circumferential direction, and the base is connected to the guide rail.

13. The fixing device according to claim 11, wherein one end of the driving device is arranged on the base of the fixing device, and another end of the driving device is arranged on a base of the adjacent fixing device, and the driving device drives the fixing device and the adjacent fixing device to move along their respective grooves and approach or move away from each other.

14. The fixing device according to claim 8, wherein the aligning device is arranged projecting relative to the segmental end face of the at least one stator segment or the at least one rotor segment in the circumferential direction.

15. The fixing device according to claim 8, further comprising a leveling device arranged under the base, and used to adjust each part of the fixing device to be on the same horizontal plane.

16. The fixing device according to claim 8, wherein the aligning device further comprises another aligning hole which is insertable by another aligning shaft of the adjacent fixing device.

17. The fixing device according to claim 8, further comprising a sliding mechanism allowing the fixing device to approach or move away from the adjacent fixing device in a preset moving path under the driving of a driving device.

18. The fixing device according to claim 17, wherein the sliding mechanism is arranged under the base and comprises a support frame with a groove and a guide rail movably connected with the groove, the groove is arranged perpendicular to the segmental end face of the at least one stator segment or the at least one rotor segment in the circumferential direction, and the base is connected to the guide rail.

19. A fixing device for assisting in assembling, disassembling and transporting an electric machine of a wind turbine, wherein a stator of the electric machine comprises a plurality of stator segments arranged in a circumferential direction, wherein a rotor of the electric machine comprises a plurality of rotor segments arranged in the circumferential direction, wherein at least two segment modules are formed by the plurality of stator segments and the plurality of rotor segments, wherein the fixing device is used to fix a segment module of the at least two segment modules with the segment module including at least one stator segment and at least one rotor segment, the fixing device comprising:

a base for supporting the at least one stator segment and the at least one rotor segment of the segment module;

one or more first fixtures, arranged on the base and in an arc structure, and used for fixing the at least one stator segment; and one or more second fixtures, arranged on the base and distributed at intervals along an outer circumference side or an inner circumference side of the one or more first fixtures, and used for fixing the at least one rotor segment, wherein the one or more first fixtures and the one or more second fixtures respectively fix the at least one stator segment and the at least one rotor segment to maintain a predetermined gap between the at least one stator segment and the at least one rotor segment, and wherein the base comprises a positioning surface arranged parallel to a segmental end face of the at least one stator segment or the at least one rotor segment in the circumferential direction, the positioning surface is provided with an aligning device comprising an aligning hole, and the aligning hole of the fixing device is insertable by an aligning shaft of an adjacent fixing device.

20. The fixing device according to claim 19, wherein the one or more second fixtures are movable relative to the one or more first fixtures in a radial direction of the electric machine to adapt for different predetermined gaps between the stator and the rotor.

* * * * *